United States Patent [19]

Gulley et al.

[11] Patent Number: 4,561,860

[45] Date of Patent: Dec. 31, 1985

[54] PROCESS AND APPARATUS FOR PRODUCTION OF REFUSE DERIVED FUEL

[75] Inventors: Brian W. Gulley, Basingstoke; Gilbert J. Williamson, Grimsby; Richard Q. Carmichael, Huntley; David F. Cooke, Wickham; Roderick Taylor, Bourne End, all of England

[73] Assignee: The Secretary of State for the Environment in Her Britannic Majesty's Government of the United Kingdom of Great Britain and Northern Ireland, London, England

[21] Appl. No.: 242,192

[22] Filed: Mar. 10, 1981

[30] Foreign Application Priority Data

Mar. 24, 1980 [GB] United Kingdom ............... 8009808

[51] Int. Cl.[4] ........................... C10L 5/00; F23G 5/02
[52] U.S. Cl. ................................. 44/10 R; 44/1 D; 44/10 A; 44/10 E; 110/223; 110/224
[58] Field of Search .................... 44/10 R, 1 D, 10 A, 44/10 E; 110/223, 224

[56] References Cited

U.S. PATENT DOCUMENTS

| | | |
|---|---|---|
| 506,363 | 10/1893 | Dowling ........................... 110/223 |
| 3,506,414 | 4/1970 | Skendrovic ....................... 44/1 R |
| 3,910,775 | 10/1975 | Jackman ........................... 44/13 |
| 3,961,913 | 6/1976 | Brenneman et al. ............. 44/10 A |
| 4,152,119 | 5/1979 | Schulz .............................. 44/10 A |
| 4,203,376 | 5/1980 | Hood ................................. 44/1 D |

Primary Examiner—William R. Dixon, Jr.
Assistant Examiner—Margaret B. Medley
Attorney, Agent, or Firm—Pollock, Vande Sande & Priddy

[57] ABSTRACT

Refuse derived fuel is produced by taking raw refuse, pulverizing it and then screening it to remove fines and oversize material, the screened residue being passed to an air classifier where the light fraction, rich in paper and plastics, is separated. This light combustible refuse fraction is then passed to a densifying machine, either directly or via a secondary shredder, to produce partially compacted material which is then dried in a rotary dryer. The dried material can be passed to a second densifying machine which produces pellets in the form of small dense cylinders or blocks having a calorific value equal to about half that of coal. Coal dust or other combustible particulate material can be added to and mixed with the combustible fraction between the two densifying machines.

23 Claims, 3 Drawing Figures

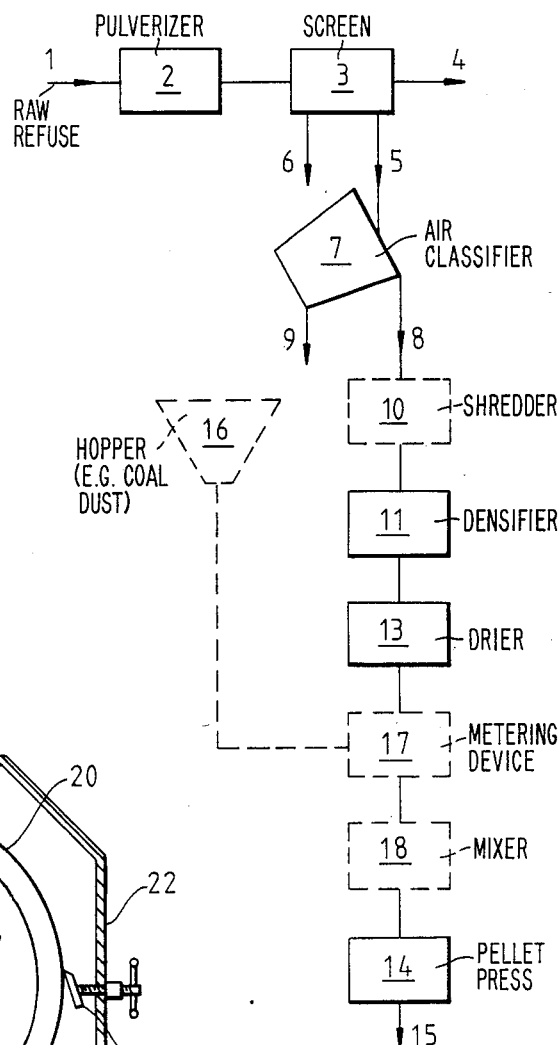
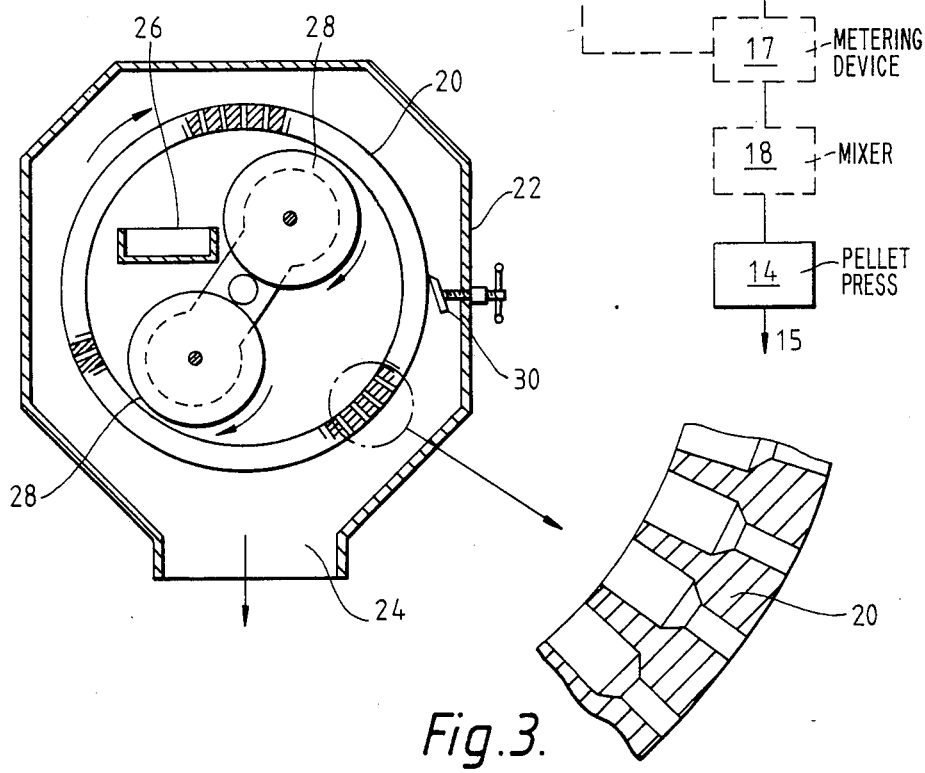

PROCESS AND APPARATUS FOR PRODUCTION OF REFUSE DERIVED FUEL

The present invention relates to a process and an apparatus for use in the production of refuse derived fuel.

In order to produce from raw refuse a substance suitable for use as a fuel, it is necessary to separate and remove material which is incombustible or otherwise unsuitable for incorporation in the fuel. One way in which this can be done is by a so-called wet-pulping process as described for example in U.K. Patent Specification No. 1517687. Typically in such a process, after removal of heavy items made of metals, the refuse is converted to an aqueous slurry containing about 4–6% solids. The slurry is treated to extract its organic constituents, after which it needs to be dewatered by mechanical means to produce a combustible fraction containing up to about 50% solids by weight. Further mechanical dewatering is not really practicable, so that substantial amounts of thermal energy are consumed in driving off further moisture from the resulting fuel either prior to or during combustion. As described in U.K. Pat. No. 1517687, the dewatered combustible fraction is dried in a rotary drier to a moisture content of 10 to 20% by weight and is then passed through a pellet mil. The energy consumed in the drying step has to be balanced against the energy available from the pelletized fuel produced, and this relatively high water content thus detracts from methods employing a wet pulping process. Disposal of the foul aqueous medium after use can also pose a considerable practical problem.

Another current process of producing refuse derived fuel operates by taking raw refuse, pulverizing it and then screening it to remove fines and oversize material, the screened residue being passed to an air classifier or other dry separator where the light fraction, rich in paper and plastics, is separated. This light combustible refuse fraction is then passed to a densifying machine, either directly or via a secondary shredder, to produce pellets in the form of small dense cylinders or blocks having a calorific value equal to about half that of coal.

This conventional system, although quite adequate to produce combustible pellets, has been found still to require some improvement in order to obtain consistent quality and quantity of pellets. In particular, it has been found that the ideal moisture content of the light fraction needs to be, in most cases, about 15 to 20% by weight whereas the combustible light material fed to the densifying machine normally has a higher moisture content, typically 35% and perhaps as much as 40% moisture by weight, although it should be noted that this means normally only about half as much water per pound of combustible material as in the corresponding dewatered wet separated material.

Thus, because it has been separated by a "dry" method, i.e. without the addition of water, the combustible light fraction contains much less water than is the case with a wet pulping process, and of course the problem of disposal of a foul aqueous medium is avoided. The same would be true of other dry methods of separation, such as for example a ballistic separator, and for this reason a dry method of separation is generally to be preferred.

In order to reduce the dry-separated combustible refuse material to the desired moisture content it is necessary to dry it and the methods of drying available, because of the very low bulk density of the light fraction (50 to 120 Kg per cubic meter) are either pneumatic or rotary, with the size, and therefore the cost of the dryers, being very high if they are adequately to deal with the very large volume of very low density light fraction to be processed.

The present invention is principally directed at providing a process and apparatus by which this very expensive large size drying apparatus can be reduced in size and simplified with substantial capital cost savings.

According to the invention there is provided a process of producing fuel from raw refuse material which has been subjected to a dry separating step in which a light moist combustible fraction has been separated therefrom, wherein the combustible fraction is partially compacted in a first densifying step, and the partially compacted combustible fraction is subsequently dried to a moisture content of from 10 to 25% by weight.

The first densifying step will normally be such as to result in a partially compacted material having a bulk density of about 200 to 350 Kgm$^{-3}$, preferably 310 to 330 Kgm$^{-3}$.

The drying step can be carried out in any suitable type of dryer, such as a rotary dryer, in which the material is tumbled within a rotating drum while a flow of warm air is passed therethrough. Other dryers suitable for particular circumstances include vibratory fluid bed dryers, and air-ventilated drying towers (with or without addition of heat).

After the drying step, this material is in a condition in which biological deterioration is substantially reduced especially if the moisture content is reduced to around 14% or less and in this form it can be stored and used as a fuel. However, a more satisfactory form of fuel is obtained according to a preferred aspect of the invention wherein the partially compacted and dried material is further compacted in a second densifying step, to form solid fuel pellets.

The density of the soid fuel pellets resulting from the second densifying step is normally in the range 350 to 850 Kgm$^{-3}$, most usually 450 to 550 Kgm$^{-3}$. The higher the water content, the lower the density. The drier material is more difficult to press and hence more costly in terms of energy consumed and machine wear. However this must be set against cheaper transport costs for the drier, hence denser, material.

A further broad aspect of the invention provides apparatus for producing fuel from raw refuse material which has been subjected to a dry separating step in which a light moist combustible fraction has been separated therefrom, said apparatus comprising a first densifying machine for partially compacting the combustible fraction and a dryer for drying the partially compacted combustible fraction received from the first densifying machine to a moisture content of from 10 to 25%.

Preferably there is also provided a second densifying machine for forming fuel pellets from the dried partially compacted material received from the dryer.

The benefits of the process and apparatus of the present invention derive from the fact that it has been found that by carrying out an initial densifying step with the light combustible refuse fraction which has too high a moisture content, and subsequently drying this partially compacted product, the drying action can take place in a dryer which is very much smaller than that which would be needed to treat the moist very light combustible fraction as initially separated. There is thus a consequent substantial saving in capital cost and outlay.

Furthermore, it has been found that despite the fact that the partially compacted product of the first densifying step is far denser and in a more compact form than the dry-separated light fraction as initially separated, there is no deleterious effect as requiring a greater energy input for drying. This is despite the fact that one would expect a better heat transfer to obtain through drying air being able to pass through the separated light fraction as compared with not being able easily to pass through the interstices of a partially compacted material. In fact, in many cases, the energy input for drying the partially compacted material is less in total than the energy input needed to dry the the light fraction prior to densification due to the smaller throughput of hot air required to carry off the moisture driven off. Conveniently the drying can be carried out in a rotary dryer economically to give the refuse material to be fed to the final densifying operation a moisture content of between 10% and 25%, normally between 15% and 20%, preferably about $17\frac{1}{2}$% moisture content by weight.

Preferably, a shredder is provided for shredding the material fed to the first densifying step and also it is preferred that the first densifying machine is one in which pellets are formed, advantageously by forcing the material through the tapering holes in a die screen.

According to a further advantageous feature of the invention, other combustible material is added to and mixed with the partially compacted combustible fraction of the refuse material between the first and the second densification steps.

Normally it is preferred that the other combustible material is added after the drying step.

The invention leads to particular advantages where the said other combustible material is in particulate form. However, in some cases there may be advantages in adding other combustible material in non-particulate form, such as tar or like substances, leading to a denser and more uniform product.

A very suitable example of the other combustible material in particulate form is coal dust, but also suitable are sawdust or other particulate combustible materials such as may result as waste from industrial processes. It has been found that particulate materials do not mix effectively with the light combustible fraction which has not been densified and is normally laminar in character. This is because the densities and other physical properties of the two materials are so different that their natural tendency is to separate when agitated. If mixing is attemped in the conventional process prior to the single densification step, it is found extremely difficult to ensure a homogeneous intermixing. The result is a heterogeneous pellet containing unevenly distributed agglomerates mainly of coal dust which destroy the cohesion of the individual pellets. On the other hand, fully densified pellets of dimensions suitable for fuel usage cannot be made to intermingle thoroughly with added particulate material without first disintegrating the pellets and there is a great tendency for pellets and added particulate material to segregate during handling. However, it is found that a coherent product results from mixing at the partially compacted stage.

Particularly in the case of coal dust, it is preferred to add the other combustible material after the drying step because the drying can drive off volatile constituents of the coal, and coal dust can also have a harmful effect on the operation of the drier, by penetrating bearings and causing excessive wear, or possibly causing explosions.

By contrast, the addition of coal dust is found to have a beneficial effect on the operation of a pelleting machine, in that the coal refuse mixture tends to attain a semi-plastic state at a relatively lower temperature than would the refuse fractions alone, so that the mixture can be forced through the die screen of a pelleting machine more readily with consequently reduced wear on machinery and power consumption.

The coal-containing pellets themselves exhibit several advantages over those formed wholly of refuse material particularly if low volatile coals are used in the blend. Phenols and Cresols present in coal increase the biological stability of the product and the product is more like conventional fuels in appearance and combustion characteristics, thus increasing its marketability. The pellets can also be handled and burnt more easily in conventional coal fired equipment.

The invention will be further described, by way of example, with reference to the accompanying drawings, in which:

FIG. 1 is a diagrammatic illustration of apparatus for feeding raw refuse to form fuel pellets therefrom which optionally include coal dust, utilizing the process of the invention;

FIG. 2 is a diagramatic sectional view of a densifying machine for forming pellets from light combustible material; and FIG. 3 is a view of a detail of a screen which can be used in the machine of FIG. 2.

Referring to FIG. 1, raw refuse is fed at 1 into a pulverizer 2 which pulverizes it into small elements, breaking down glass and other solids to relatively small sized pieces. From the pulverser 2 the refuse passes to a screen 3 which removes fines at 6 and oversized materials at 4 with the residue passing at 5 to a dry separator in the form of air classifier 7 from which the heavier material leaves at 9 and the lighter material consisting mainly of paper and plastics at 8. The classifier can be of the type described in British Pat. No. 1577325 which is in the form of a rotating frusto-conical vessel with its lower end tilted downwardly. The screened refuse is fed into the wide upper end of the rotating vessel while a spiral stream of air passes up the vessel from its narrow end in order gently to lift off and carry away the light paper and plastics material from the tumbling refuse.

The light combustible refuse leaving the classifier at 8 can optionally be passed through a shredder 10 before being passed to a densifying machine 11 which compresses the light refuse and compacts it to form separate intermediate pellets. These intermediate pellets are then passed to a rotary dryer 13 which reduces the material leaving the densifying machine 11, which commonly has a moisture content of 24% to 40% by weight, usually about 35%, to a preferred moisture content of about $17\frac{1}{2}$% by weight, which is suitable for feeding into a further densifying machine in the form of a pellet press 14 from which the solid fuel pellets are received at 15. While the desired moisture content can be varied when fed to the final densifying machine depending upon the type of waste refuse being processed, perhaps within a range as large as 10% to 25%, in most cases a moisture content of between 15% and 20%, preferably about $17\frac{1}{2}$%, is desirable.

If desired, coal dust or other particulate combustible material can be added from a hopper 16 to the dried material, downstream of the shredder 10 if this device is present and normally downstream of the dryer 13, as shown. The relative proportions of coal dust and dried refuse material are controlled by a metering device 17, and thorough mixing is effected in a mixer 18. Drying of the coal dust, even if moist, is unnecessary because its moisture will not be transferred to the dried material to any significant extent prior to pelleting in the pellet press 14. Preferably the coal fraction contains no particles which cannot pass a ¼ inch (6 mm) sieve. The proportion of coal can be any desired value from zero to an upper limit set by deterioration in the pellet quality. Pellets have been produced and found satisfactory which contain respectively 25% and 50% by weight of coal dust.

FIG. 2 illustrates a typical pelleting machine which comprises an outer housing 22 having a pellet discharge outlet 24 and containing a rotating die screen 20. A vibrating feeder 26 is provided to feed material to be pelleted to the interior of the rotating die screen 20 in which are mounted a pair of pressure rollers 28 which are rotatable about fixed axes. As shown in FIG. 3, the holes through the die screen 20 are tapered to be wider at their inner end than at their outer end and, although not shown in the drawings, the holes normally have a round cross-section to give cylindrical pellets. However, one commercially available ring roll press does have a cylindrical screen with holes shaped to prouduce pellets of rectangular cross-section. An adjustably positionable pellet knock-off blade 30 is provided to remove the material extruded from the exterior surface of the rotating die 20 giving pellets of the required length, which fall to leave through the outlet 24.

In order to use the densifying machine to make pellets the rotating die screen 20 is rotated clockwise as shown in FIG. 2 past the pressure rollers 28, and material fed from the vibrating feeder 26 is held against the inner peripheral surface of the screen by centrifugal action and is forced by the die rotation into the pressure roller nip and is extruded through the tapered die holes with the extruded pellets being knocked off in convenient lengths by the adjustable pellet knock-off blade.

Alternative forms of densifying or pelleting machines may be used as convenient, for example, the feed material may be fed by an auger to a die screen to form the required pellets.

We claim:

1. In a process of producing fuel from raw refuse material comprising the steps of:
   subjecting the material to a dry separating step to separate therefrom a light moist combustible fraction having a moisture content not greater than 40% by weight;
   subsequently partially compacting the thus separated light moist combustible material in a first densifying step; and
   drying the thus separated light moist combustible material, to a moisture content of from 10 to 25% by weight, by passing air through the said material, the improvement which comprises carrying out said drying step after said partial compaction step whereby said light moist combustible material is in a partially compacted state when it is air dried in said drying step.

2. A process according to claim 1 wherein the first densifying step results in a partially compacted material having a bulk density of from 200 to 350 Kgm$^{-3}$.

3. A process according to claim 2 wherein the first densifying step results in a partially compacted material having a bulk density of from 310 to 330 Kgm$^{-3}$.

4. A process according to claim 1 wherein the partially compacted material is dried in a rotary drier.

5. A process according to claim 1 wherein the partially compacted material is dried to a moisture content of from 15 to 20% by weight.

6. A process according to claim 5 wherein the partially compacted material is dried to a moisture content of about 17½% by weight.

7. A process according to claim 1 wherein the partially compacted and dried material is thereafter further compacted in a second densifying step.

8. A process according to claim 7 wherein said second densifying step forms solid fuel pellets, the bulk density of the solid fuel pellets resulting from the second densifying step being from 350 to 850 Kgm$^{-3}$.

9. A process according to claim 8 wherein the bulk density of the solid fuel pellets resulting from the second densifying step is from 450 to 550 Kgm$^{-3}$.

10. A process according to claim 7 wherein at least one of the densifyng steps comprises compacting the material being processed by forcing it through a screen.

11. A process according to claim 7 wherein other combustible material is added to and mixed with the partially compacted combustible fraction of the refuse material between the first and second densification steps.

12. A process according to claim 11 wherein the other combustible material is added after the drying step.

13. A process according to claim 12 wherein the said other combustible material is coal dust.

14. A process according to claim 13 wherein the coal dust is screened to a size less than ¼ inch prior to addition to the refuse material.

15. A process according to claim 1 wherein the refuse is shredded prior to the first densifying step.

16. A process according to claim 1 wherein the dry separating step is carried out in an air classifier.

17. In an apparatus for producing fuel from raw refuse material of the type comprising means for subjecting the material to a dry separating step to separate a light moist combustible fraction therefrom, a first densifying machine for partially compacting the thus separated light moist combustible material, and a drying device adapted to pass air through the thus separated light moist combustible material to dry said material to a moisture content of from 10 to 25% by weight, the improvement which comprises so arranging said first densifying machine and said drying device relative to one another and relative to the passage of said material thereto that said material is compacted by said first densifying machine prior to the drying of said partially compacted material by said drying device.

18. Apparatus according to claim 17 wherein the drying device is a rotary drier.

19. Apparatus according to claim 17 comprising a second densifying machine for compacting further the dried material received from the drying machine.

20. Apparatus according to claim 19 wherein at least one of the densifying machines comprises a die screen and rollers arranged to cause material to be densified to be forced through the screen.

21. Apparatus according to claim 17 including a shredder for shredding material being fed to the first densifying machine.

22. Apparatus according to claim 19 including, between the first and the second densifying machine, means for adding other combustible material in particulate form to the combustible fraction, and means for mixing the combustible fraction and the other combustible material.

23. Apparatus according to claim 1 wherein the means for adding other combustible material is downstream of the drying device.

* * * * *